(12) United States Patent
Key et al.

(10) Patent No.: US 6,803,146 B2
(45) Date of Patent: Oct. 12, 2004

(54) BATTERY TERMINAL AND METHOD FOR MAKING THE SAME

(75) Inventors: Tony E. Key, Yorktown, IN (US); John Black Barclay, Jr., Anderson, IN (US); Steven G. Kensinger, Burnsville, MN (US)

(73) Assignee: Delphi Technologies, Inc., Troy, MI (US)

( * ) Notice: Subject to any disclaimer, the term of this patent is extended or adjusted under 35 U.S.C. 154(b) by 240 days.

(21) Appl. No.: 09/909,359

(22) Filed: Jul. 19, 2001

(65) Prior Publication Data

US 2003/0017392 A1 Jan. 23, 2003

(51) Int. Cl.[7] .......................... H01M 2/30; H01M 2/08
(52) U.S. Cl. ...................................... 429/182; 429/184
(58) Field of Search ................................ 429/182, 184

(56) References Cited

U.S. PATENT DOCUMENTS

| | | | |
|---|---|---|---|
| 3,767,467 A | * 10/1973 | Miller et al. | 429/179 |
| 4,154,907 A | 5/1979 | Crow | 429/179 |
| 4,237,603 A | 12/1980 | Crow | 29/623.4 |
| 4,317,871 A | * 3/1982 | Wolf et al. | 429/179 |
| 4,351,890 A | * 9/1982 | Oxenreider | 429/179 |
| 5,422,202 A | 6/1995 | Spiegelberg et al. | 429/179 |
| 5,425,170 A | 6/1995 | Spiegelberg et al. | 29/874 |
| 5,589,294 A | 12/1996 | Spiegelberg et al. | 429/178 |
| 5,663,015 A | * 9/1997 | Hooke et al. | 429/181 |
| 5,814,421 A | 9/1998 | Spiegelberg et al. | 429/178 |
| 6,152,785 A | 11/2000 | Haller et al. | |
| 6,153,329 A | 11/2000 | Raschilla et al. | |
| 6,738,552 B2 | 5/2004 | Halbach et al. | |

* cited by examiner

Primary Examiner—Gregg Cantelmo
(74) Attorney, Agent, or Firm—Jimmy L. Funke

(57) ABSTRACT

A battery terminal is configured to be secured to a battery case and includes a terminal assembly, and a ring. The terminal assembly includes an insert having a threaded bore, and an outer metal portion having a base with an annular flange configured to engage the inner surface of the case. The terminal further includes an anti-turn system with a first set of angularly-spaced bosses with intervening slots formed on a boss on the case, a second set of angularly-spaced bosses with intervening slots on a first side of the ring facing the case, which are complementary to the first set to form interlocking features. A set of recesses on the opposite side of the ring is configured to receive spun-over lead material during final finishing to form another pair of interlocking features. The exterior spun battery terminal eliminates corrosion that would otherwise occur due to cold worked lead contacting acid.

11 Claims, 3 Drawing Sheets

BATTERY TERMINAL AND METHOD FOR MAKING THE SAME

BACKGROUND OF THE INVENTION

1. Technical Field

The present invention relates generally to a battery terminal and a method for making the same.

2. Description of the Related Art

It is known generally to provide an electric storage battery of the type having external terminals on the side or end walls of the battery case. Typically, such terminals are not of the post type, but rather are of the recessed, threaded female type terminal, as seen by reference to U.S. Pat. No. 5,814,421 to Spiegelberg et al. Spiegelberg et al. disclose a method for forming such a battery terminal having a threaded hard metal insert received within an outer portion formed of lead, the lead portion being deformed (i.e., cold worked) by an orbital head-forming apparatus to secure the hard metal insert within the outer lead portion. Spiegelberg et al. further disclose that the outer portion includes a spline ring to prevent rotation of the terminal within the battery housing. Spiegelberg et al. also disclose sealing rings on the outer lead portion and which are molded into the case. The anti-rotation approach in Spiegelberg et al., however, does not provide satisfactory resistance to rotation in certain circumstances and the sealing approach requires a complicated insert molding process or the like.

It is further known to insert a partially formed battery terminal from the outside of the battery case, and secure and finish the terminal through cold working of the terminal through an orbital finishing step performed on an inwardly facing portion of the terminal (i.e., towards the interior of the battery case). However, it has been found that the cold worked lead, which is exposed to acid (e.g., sulfuric acid solution in a lead-acid battery), results in accelerated corrosion, which may result in acid solution leaking out of the battery case in and around the terminal area.

There is therefore a need for an improved battery terminal that minimizes or eliminates one or more of the problems as set forth above.

SUMMARY OF THE INVENTION

One advantage of the present invention is that it provides an exterior (i.e., on the outside of the battery case) spin riveted terminal to eliminate the interior (i.e., interior of the battery case) lead cold working to thereby minimize corrosion as described in the Background, and the accompanying leakage associated therewith. Another advantage of the present invention is that it provides an anti-rotation arrangement of interlocking bosses/slots that provide a torque-turning resistance that is improved over conventional approaches taken in the art. Another advantage of the present invention is that it provides a battery terminal having a sealing system configured to seal the battery terminal area to thereby prevent or minimize leakage of fluid, such as sulfuric acid solution. Still another advantage according to the present invention is that it provides a battery terminal having a mechanism for minimizing or eliminating acid stratification, which minimizes corrosion (as described in greater detail hereinafter).

A battery terminal according to the invention is configured to be secured to a battery case from an exterior side thereof. The battery terminal comprises a terminal assembly, a ring, and a terminal anti-rotation system. The terminal assembly extends generally along a main axis and includes (i) an insert having a threaded bore and (ii) an outer metal portion having a base with an annular flange configured to engage an inner surface of the case. The terminal assembly is inserted from the inside of the case. The ring is configured to be disposed over the terminal assembly from the exterior of the case. The anti-rotation system includes a first set of angularly-spaced bosses with intervening slots formed on a case boss on an outer surface of the battery case. The anti-rotation system further includes a second set of angularly-spaced bosses with intervening slots on a first side of the ring that faces the case boss when inserted over the terminal assembly. The second set of bosses/slots are complementary with the first set to form a first pair of interlocking features. The anti-rotation system also includes a set of recesses on a second side of the ring opposite the first side configured to receive portions of the terminal assembly that are subsequently deformed into such recesses.

In a preferred embodiment, the portions of the terminal assembly to be received into the set of recesses comprise the distal end portions of the terminal assembly which are, at least in part, deformed in accordance with an orbital spin coldworking operation. A second preferred embodiment is also presented wherein the terminal assembly and the ring are joined using a welding operation.

In a still further embodiment, the battery terminal further includes (i) an inventive sealing system and (ii) radial bores that allow acid solution to communicate between the main interior of the case and an interior seal which is located in an annular groove.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
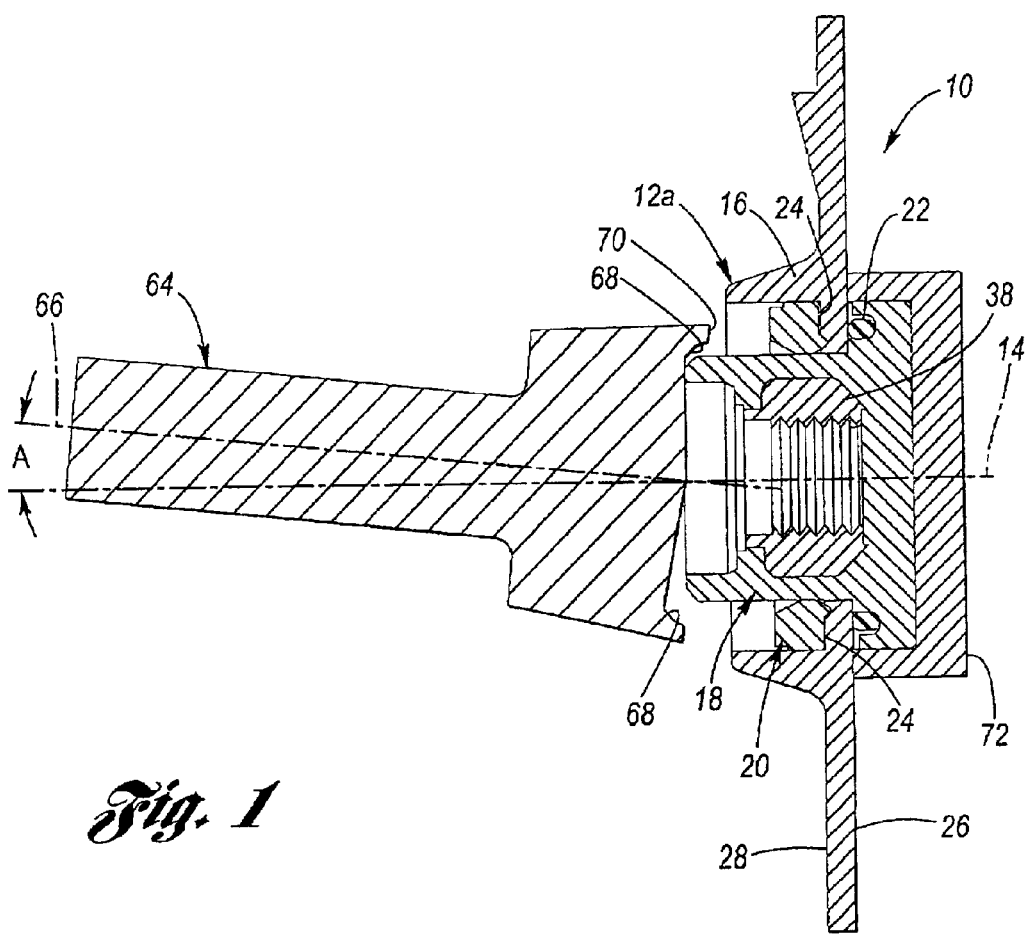
FIG. 1 is a simplified, cross-sectional view of a partially-finished battery terminal in accordance with a first embodiment of the present invention.

Referring now to the drawings wherein like reference numerals are used to identify identical components in the various views, FIG. 1 is a partial side view, with portions in cross-section, of an electric storage battery 10. The invention may be usefully employed to produce a lead-acid, side terminal type battery 10 (e.g., a conventional 12 volt automotive type storage battery). It should be understood, however, that the present invention may be usefully employed in the making of other types of storage batteries (e.g., marine). The foregoing is exemplary only, and not limiting in nature. Only a portion of battery 10 is shown in FIG. 1. It should be further understood that battery 10 includes various, conventional portions that are not shown, such as a cover, a plurality of electrical cells connected in a desired arrangement, a conventional venting arrangement, and the like.

FIG. 1 shows a partially finished battery terminal 12a that is generally cylindrical-shaped and extends along a main axis 14, and which is configured to be secured to a battery case 16. As further illustrated, battery terminal 12a also includes a terminal assembly 18, a ring member 20, a seal element 22, and predetermined sealant material 24.

Case 16 is configured generally to retain the inner components of battery 10, and may comprise conventional, electrical insulating material, such as various plastics (e.g., polypropylene). As shown in FIG. 1, battery case 16 includes an inner or inside surface 26, and an outer or outside surface 28. For reference, inner surface 26 faces the interior of storage battery 10, and is configured to, during the service life of storage battery 10, come into contact with sulfuiric acid solution, for example.

Figure 2:
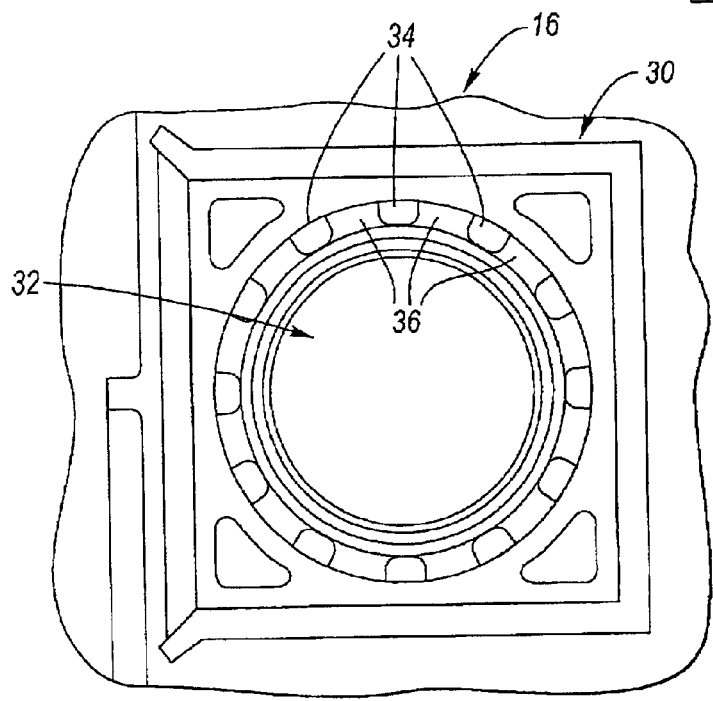
FIG. 2 is a plan view of a main boss portion of a battery case showing angularly spaced anti-rotation bosses with intervening slots.

Referring to FIG. 2, battery case 16 further includes a pair of main bosses 30 (only one shown in FIG. 2) that are configured, generally, to cooperate with the components described herein to form the battery terminal 12. Main boss 30 includes a central through-bore 32, and a set of angularly-spaced lands or bosses around bore 32, separated by and raised relative to, intervening slots 36. As will be described in greater detail below, bosses 34 and slots 36 form part of a terminal anti-rotation system that provides improved torque turning resistance compared to conventional anti-rotation approaches. Bore 32 is sized to accommodate terminal assembly 18 therethrough.

Figure 3:
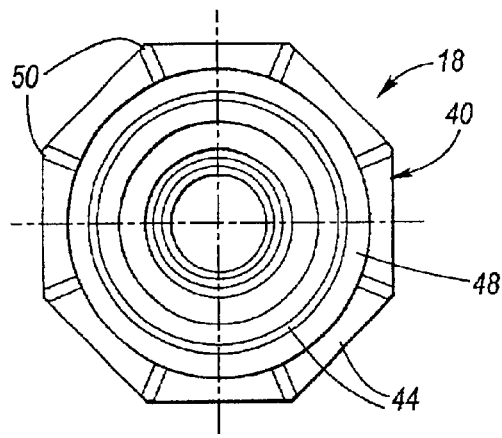
FIGS. 3, 4 and 5 are a front, a side and a top cross-sectional view, respectively, of a terminal assembly portion of the terminal shown in FIG. 1.
Figure 4:
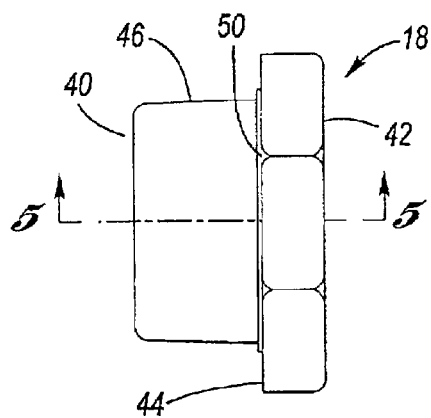
Figure 5:
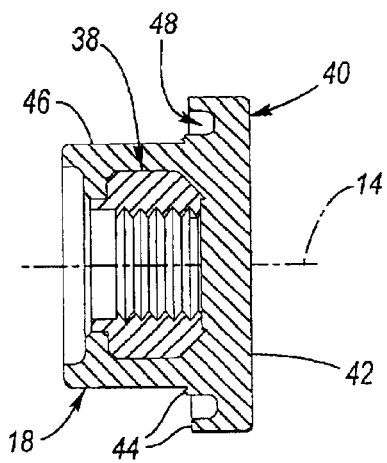

FIGS. 3, 4 and 5 show terminal assembly 18 in greater detail. Terminal assembly 18 includes an insert 38 having a threaded bore, and an outer portion 40. Outer portion 40 includes a base 42, a flange 44, an annular wall 46, a circumferentially-extending seal groove 48, and a plurality of radial grooves 50. Terminal assembly 18, at least as shown in FIG. 1, is preformed according to known processes. Insert 38 may be made from relatively durable, electrically conductive material such as stainless steel. Outer portion 40 may be, in contrast, made from relatively soft, electrically conductive material, such as lead or lead alloy. Annular wall 46 extends longitudinally from base 42 to form a barrel-shaped component. In the illustrated embodiment, portions of annular wall 46 extend radially inwardly over an exterior-facing surface of insert 38 to retain insert 38 in outer portion 40. Outer portion 40 is closed at the base end. Circumferentially extending groove 48 is configured in size and shape to receive an oval elastomeric seal element 22 (e.g., an "O-Ring" style seal). Thus, when installed in battery case 16, electrolytes contained in the interior of case 16 will not leak through terminal 12 out of the case. As will be described in greater detail below, circumferentially-extending groove 48, and seal element 22 form, in part, a sealing system in accordance with the invention.

The plurality of radial grooves 50 are located adjacent to the circumferentially-extending seal groove 48 and provide a channel for communication of sulfuric acid water solution to flow in and out of groove 48. This communication of acid solution (in and out) minimizes or eliminates acid stratification, which, as known to those of ordinary skill in the art, is an accelerating factor in corrosion. This feature therefore reduces leaks.

Outer portion 40 further includes an open end, which, in the finished battery terminal 12b (best shown in FIG. 9), has a predetermined shape/profile configured to be electrically and mechanically compatible with a selected connector interface (e.g., an automotive battery connector).

Figure 6:
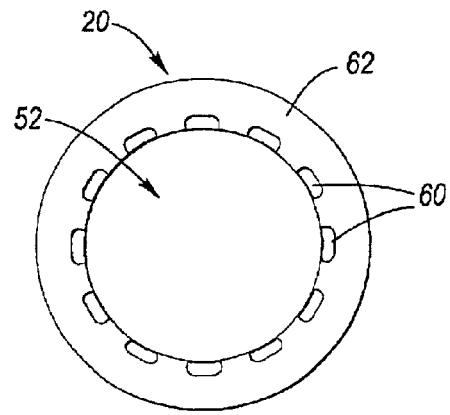
FIGS. 6, 7 and 8 are a front plan, a side cross-sectional and a rear plan view, respectively, of a ring portion of the terminal shown in FIG. 1.
Figure 7:
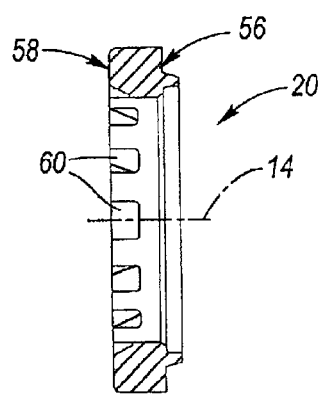
Figure 8:
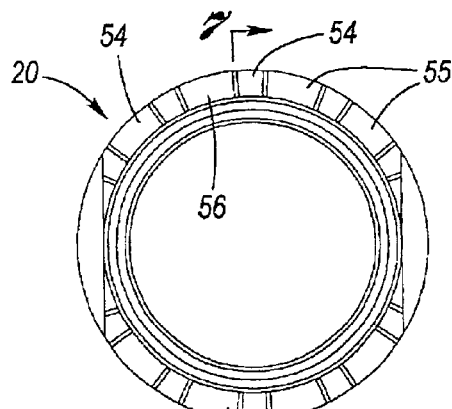

FIGS. 6, 7 and 8 are front, side cross-section, and rear views, respectively, showing, in greater detail, the ring member 20 of FIG. 1. As shown in the illustrated embodiment, ring 20 includes a central through-bore 52, a set of angularly spaced bosses 54 separated by and raised relative to intervening slots 55, all located on a side 56 of ring 20 that faces the main case boss 30. In addition, ring 20 further includes, on an opposing side 58, a further set of angularly-spaced recesses 60 below a surface 62 of ring 20. The set of bosses 54 are angularly-spaced and are complementary in shape and orientation with the set of bosses and slots 34, 36 of main case boss 30 to form a first pair of interlocking features for terminal anti-rotation resistance. The set of recesses 60 on the opposite side of ring 20 are configured to receive the spun-over end portions of the annular wall part of the terminal assembly 18 (i.e., forming bumps or notches), to thereby form a second pair of interlocking features. The two pairs of interlocking features described herein define an improved terminal anti-rotation system according to the invention that provides a higher torque turning resistance than conventional approaches.

Central through-bore 52 is sized so as to allow it to be slipped over and/or pressed onto an outer surface of annular wall 46. Ring member 20 may be formed of soft metal, such as lead or lead alloy.

The present invention relates to, among other things, a battery terminal, and method for making the same that includes finishing and securing of the side terminal 12 to a wall, typically a side wall or end wall, of storage battery 10. Products and methods consistent with the invention complete the forming and attachment of the battery terminal to the battery case from the exterior of the battery, so that cold worked metal (e.g., lead) of the finished product does not contact acid (e.g., sulfuric acid) conventionally contained in the interior of battery 10. While cold working the partially finished terminal from the exterior side of the battery case solves the corrosion problem referred to in the Background, several challenges must be overcome in order to reliably secure the terminal to the battery case 16.

FIG. 1 shows an initial set-up for processing according to the invention, illustrating a partially finished terminal 12a. The ring member 20 has sealant material 24 applied to side 56, particularly over angularly-spaced bosses and intervening slots 54, 55. In one embodiment, the sealant material 24 comprises a hot melt sealant, but may be other various sealants known to those of ordinary skill in the art. The ring 20 is then applied to main case boss 30 so that the complementary bosses/slots interlock, as described above, in order to provide a terminal anti-rotation function. The elastomeric seal element 22 is then disposed in seal groove 48 of terminal assembly 18. The partially finished terminal assembly 18 is then inserted through opening 32 and through-bore 52 of ring item 20 from the inside of battery 10. The terminal assembly 18 is inserted so that the annular flange 44 substantially engages inside surface 26 of case 16. The seal 22 is thus compressed to perform a sealing function, as known in the art. The partially finished terminal 12a is then supported. In the illustrated embodiment, the support is provided from the inside of storage battery 10 by way of a support member 72 against base 42 of terminal assembly 18. The support 72 retains the terminal assembly 18 in position for further processing.

FIG. 1 further shows a tool 64 having an axis 66. Tool 64 has a head portion configured to engage the end portions of the terminal assembly 18. The head of tool 64 comprises a surface 68, and a lip portion 70. Tool 64 is nominally maintained at an angle "A" relative to main axis 14. In a preferred embodiment, an apparatus (not shown) is configured to move the tool 64 in an orbital pattern relative to axis 14. That is, the axis 66 of tool 64 is moved in a pattern that approximates an inverted cone. Methods for orbital forming, and machines for performing the same, are known generally in the art, as seen by reference to Spiegelberg et al. referred to in the Background. In a constructed embodiment, angle "A" may be approximately six (6) degrees. Movement of tool 64 deforms the distal or end edges of annular wall 46 of terminal assembly 18, causing the lead material to roll over and eventually into recesses 60. Movement of the tool 64 is discontinued when a desired level of deformation of the terminal 12a has occurred.

Figure 9:
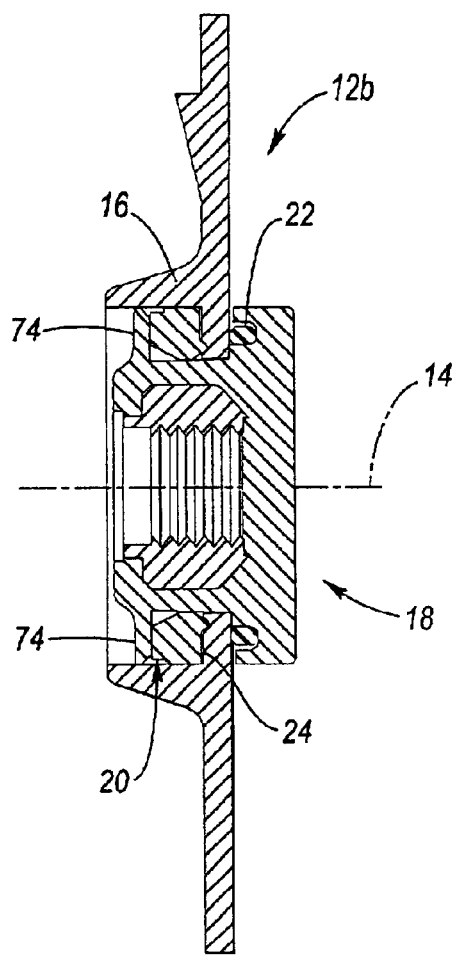
FIG. 9 is a simplified, cross-sectional view of a finished battery terminal in accordance with the first embodiment of the present invention.

FIG. 9 shows a finished battery terminal 12b. As seen in FIG. 9, predetermined portions 74 of the annular wall 46 are orbitally spin riveted onto and into the angularly-spaced recesses 60, thus providing a tight lead assembly clamp onto case 16.

The exterior spin riveted battery terminal according to the present invention eliminates the interior lead cold working of conventional approaches, which consequently corrode and leak. In addition, an anti-rotation system is provided that includes first and second pairs of interlocking features to provide an increased torque turning resistance relative to conventional battery terminals. The first pair of interlocking features occurs between the boss of the battery case, and a boss-facing side of ring element 20. A second pair of interlocking features is formed on an opposite side of the ring item in combination with the spun over lead material, as described above. The invention further includes an improved sealing system including both an elastomeric seal disposed in a circumferentially-extending groove in a flange portion of the terminal assembly 18, as well as sealant material disposed on an outer surface of battery case 24 located near and around the through-bore 32. Finally, radial grooves 50 allow sulfuric acid water solution to flow in and out of seal groove 48, thereby minimizing or eliminating acid stratification that leads to corrosion, and which if left unaddressed, may lead to leaks.

Figure 10:
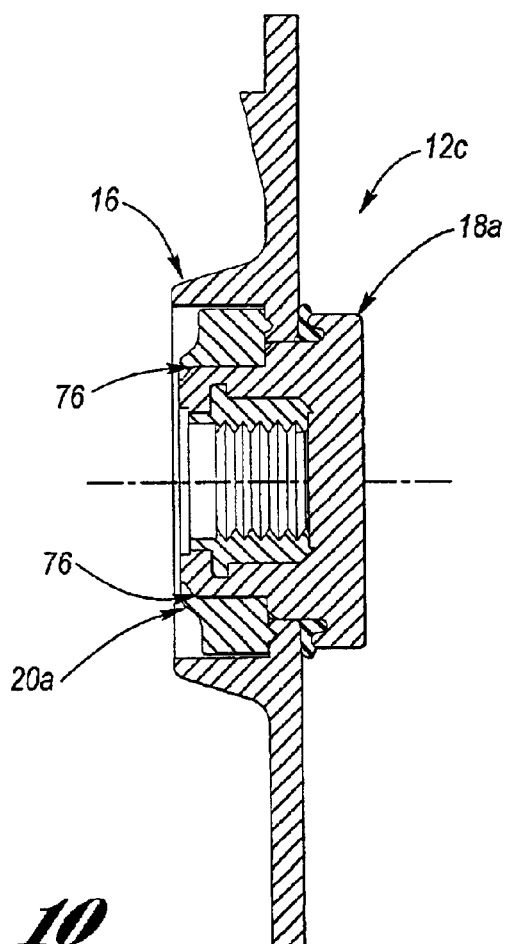
FIG. 10 is a simplified cross-sectional view of a second preferred embodiment according to the invention featuring a welded connection between the ring and terminal assembly.

FIG. 10 is a simplified, cross-sectional view of a second preferred embodiment in accordance with the present invention, herein designated battery terminal 12c. Battery terminal 12c comprises an exterior welded terminal assembly 18a onto a modified ring member 20a. Terminal assembly 18a comprises a lead barrel-type terminal assembly, as described above in connection with the first preferred embodiment, and which is assembled from the inside or interior of battery case 16. First, the terminal assembly 18a is inserted so that a flange portion thereof engages an inner surface of case 16, which compresses the seal disposed in the seal groove. A ring item, preferably made from lead, is then pressed (via an interference fit) over the annular wall of terminal assembly 18a. The ring member 20a is then welded, for example, resistance welded, to the terminal assembly 18a. The weld areas are designated by reference numeral 76 in FIG. 10. A sealant or the like may be applied to a groove portion of main boss 30 of case 16 immediately radially outwardly of the through-bore 32 to provide an acid barrier between the case 16 and the ring 20a. Also, as in the first embodiment described above, various elastomeric seals may be used (i.e., for example located in a circumferentially-extending groove in the flange of terminal assembly 18a) as a seal between the terminal assembly 18a and the case 16.

What is claimed is:

1. A battery terminal configured to be secured to a battery case comprising:
   a terminal assembly extending along a main axis and including an insert having a threaded bore and an outer metal portion having a base with an annular flange configured to engage an inner surface of the case;
   a ring configured to be disposed over said terminal assembly; and
   an anti-rotation system including a first set of angularly-spaced bosses with intervening slots formed on an outer surface of the case, a second set of angularly-spaced bosses with intervening slots on a first axial side of said ring facing said case and which are complementary with said first set of bosses and slots, and a set of recesses on a second axial side of said ring opposite said first axial side configured to receive portions of said terminal assembly.

2. The battery terminal of claim 1 wherein said portions of said terminal assembly to be received into said set of recesses comprise end portions of an annular wall of said terminal assembly.

3. The battery terminal of claim 2 wherein said annular wall is at least in part deformed into said set of recesses.

4. The battery terminal of claim 3 wherein said annular wall is orbitally spin riveted.

5. The battery terminal of claim 1 wherein said outer metal portion of said terminal assembly comprises lead.

6. The battery terminal of claim 1 further including a sealing system, said sealing system comprising:
   an annular groove circumferentially-extending in said flange on a side configured to engage said inner surface of said case;
   an elastomeric seal configured to be disposed in said groove to form a seal between said inner surface of said case and said terminal assembly; and
   a sealant material disposed between said first axial side of said ring and said case.

7. The battery terminal of claim 6 wherein said sealant material comprises a hot melt material.

8. The battery terminal of claim 6 further including communication means for allowing a fluid to communicate between an interior of said case and said groove.

9. A battery terminal configured to be secured to a battery case comprising:
   a terminal assembly extending along a main axis and including an insert having a threaded bore and an outer metal portion having a base with an annular flange configured to engage an inner surface of the case;
   a ring configured to be disposed over said terminal assembly;
   an anti-rotation system including a first set of angularly-spaced bosses with intervening slots formed on an outer surface of the case, a second set of angularly-spaced bosses with intervening slots on a first side of said ring facing said case and which are complementary with said first set of bosses and slots, and a set of recesses on a second side of said ring opposite said first side configured to receive portions of said terminal assembly;
   a sealing system, said sealing system comprising,
   an annular groove circumferentially-extending in said flange on a side configured to engage said inner surface of said case,
   an elastomeric seal configured to be disposed in said groove to form a seal between said inner surface of said case and said terminal assembly; and a sealant material disposed between said first side of said ring and said case; and communication means for allowing a fluid to communicate between an interior of said case and said groove, wherein said communication means comprises a plurality of radially oriented bores extending from a radially outer surface of said base of said terminal assembly to said groove.

10. The battery terminal of claim 1 wherein said ring and terminal assembly are welded together.

11. A battery terminal configured to be secured to a battery case comprising:
- a terminal assembly extending along a main axis and including an insert having a threaded bore and an outer metal portion having a base with an annular flange configured to engage an inner surface of the case;
- a ring configured to be disposed over said terminal assembly;
- an anti-rotation system including a first set of angularly-spaced bosses with intervening slots formed on an outer surface of the case, a second set of angularly-spaced bosses with intervening slots on a first axial side of said ring facing said case and which are complementary with said first set of bosses and slots, and a set of recesses on a second axial side of said ring opposite said first side configured to receive portions of said terminal assembly;
- a sealing system, including,
    - an annular groove circumferentially extending in said flange on a side configured to engage said inner surface of said case,
    - an elastomeric seal configured to be disposed in said groove to form a seal between said inner surface of said case and said terminal assembly,
    - a sealant material comprising a hot melt material disposed between said first axial side of said ring and said outer surface of said case; and
    - communication means for allowing a fluid to communicate between an interior of said case and said groove.

* * * * *